(12) United States Patent
Kojima et al.

(10) Patent No.: US 12,237,775 B2
(45) Date of Patent: Feb. 25, 2025

(54) POWER SUPPLY DEVICE AND IMAGE FORMATION APPARATUS

(71) Applicant: Oki Electric Industry Co., Ltd., Tokyo (JP)

(72) Inventors: Tomoyuki Kojima, Tokyo (JP); Taku Oryoji, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/499,864

(22) Filed: Nov. 1, 2023

(65) Prior Publication Data
US 2024/0162821 A1 May 16, 2024

(30) Foreign Application Priority Data
Nov. 11, 2022 (JP) ................. 2022-180996

(51) Int. Cl.
*H02M 3/335* (2006.01)
*G03G 15/00* (2006.01)
*H02M 1/00* (2007.01)
*H02M 1/34* (2007.01)

(52) U.S. Cl.
CPC .... *H02M 3/33523* (2013.01); *G03G 15/5004* (2013.01); *G03G 15/80* (2013.01); *H02M 1/0032* (2021.05); *H02M 1/007* (2021.05); *H02M 1/34* (2013.01)

(58) Field of Classification Search
CPC .............. G03G 15/80; G03G 15/5004; G03G 15/2039; G03G 15/0283; G03G 15/205; G03G 2215/00978
See application file for complete search history.

(56) References Cited

U.S. PATENT DOCUMENTS

| | | | |
|---|---|---|---|
| 10,320,301 B2* | 6/2019 | Chung | H02M 1/08 |
| 11,327,426 B2* | 5/2022 | Nakazawa | G03G 15/5004 |
| 11,334,009 B2* | 5/2022 | Fujikura | H02M 1/34 |
| 2007/0059016 A1* | 3/2007 | Sato | H02M 3/33507 399/88 |
| 2014/0176076 A1* | 6/2014 | Momo | H01M 10/0583 320/128 |

FOREIGN PATENT DOCUMENTS

JP 2022-39229 A 3/2022

* cited by examiner

Primary Examiner — Jessica L Eley
(74) Attorney, Agent, or Firm — METROLEX IP LAW GROUP, PLLC; Robert L. Scott, Esq.

(57) ABSTRACT

A power supply device according to an embodiment may include: a voltage generator configured to generate, from a commercial power supply, a first voltage and a second voltage lower than the first voltage; a voltage step-down part configured to decrease the first voltage to the second voltage; a bypass part configured to output the second voltage output from the voltage generator, with the voltage step-down part bypassed; and a controller configured, in a normal operation mode, to cause the voltage generator to generate and output the first voltage and to cause the voltage step-down part to operate and decrease the first voltage to the second voltage and output the second voltage, and configured, in a power-saving mode, to cause the voltage generator to generate the second voltage and output the second voltage through the bypass part without causing the voltage step-down part to operate.

12 Claims, 7 Drawing Sheets

POWER SUPPLY DEVICE AND IMAGE FORMATION APPARATUS

CROSS REFERENCE TO RELATED APPLICATIONS

This application claims priority based on 35 USC 119 from prior Japanese Patent Application No. 2022-180996 filed on Nov. 11, 2022, entitled "POWER SUPPLY DEVICE AND IMAGE FORMATION APPARATUS," the entire contents of which are incorporated herein by reference.

BACKGROUND

The disclosure may relate to a power supply device and an image formation apparatus, and may be preferably applicable to, for example, an image formation apparatus that is supplied with power from a commercial power supply.

A so-called dual-transformer power supply device that includes a main power supply unit and a sub-power supply unit has been used. In the dual-transformer power supply device, the main power supply unit generates a DC voltage of 24 V from a commercial power supply, and the sub-power supply unit generates a DC voltage of 5 V from the commercial power supply. In the power-saving mode, the sub-power supply unit is operated to generate a DC voltage of 5 V without the main power supply unit being operated.

In contrast to this, a so-called single-transformer power supply device has been proposed which includes a main power supply unit, but not a sub-power supply unit (see, for example, Patent Document 1: Japanese Patent Application Publication No. 2022-39229). In the single-transformer power supply device, the main power supply unit generates a DC voltage of 24 V from a commercial power supply, and a DC-DC converter generates a DC voltage of 5 V from the DC voltage of 24 V. The single-transformer power supply device can have a size smaller than that of the dual-transformer power supply device.

Patent Document 1: Japanese Patent Application Publication No. 2022-39229

SUMMARY

However, the single-transformer power supply device includes no sub-power supply unit. Therefore, even in the power-saving mode, the main power supply unit may generate a DC voltage of 24 V from a commercial power supply, and at the same time, the DC-DC converter may generate a DC voltage of 5 V from the DC voltage of 24 V. Thus, power consumption may be high in the power-saving mode.

An object of an embodiment of the disclosure may be to propose a power supply device and an information processing system that can have reduced power consumption in the power-saving mode.

A first aspect of an embodiment of the disclosure may be a power supply device according to an embodiment may include: a voltage generator configured to generate, from a commercial power supply, a first voltage and a second voltage lower than the first voltage; a voltage step-down part configured to decrease the first voltage to the second voltage; a bypass part configured to output the second voltage output from the voltage generator, with the voltage step-down part bypassed; and a controller configured, in a normal operation mode, to cause the voltage generator to generate and output the first voltage and to cause the voltage step-down part to operate and decrease the first voltage to the second voltage and output the second voltage, and configured, in a power-saving mode, to cause the voltage generator to generate the second voltage and output the second voltage through the bypass part without causing the voltage step-down part to operate.

A second aspect of an embodiment of the disclosure may be an image formation apparatus that includes the power supply device according to the first aspect described above.

According to at least one of the above-described aspects, power consumed in the voltage generator and the voltage step-down part can be reduced in the power-saving mode.

Therefore, at least one of the above-described aspects can provide a power supply device and an image formation apparatus which can reduce power consumption in a power-saving mode by reducing power consumed in a voltage generator and a voltage step-down part in the power-saving mode.

DETAILED DESCRIPTION

Figure 1:
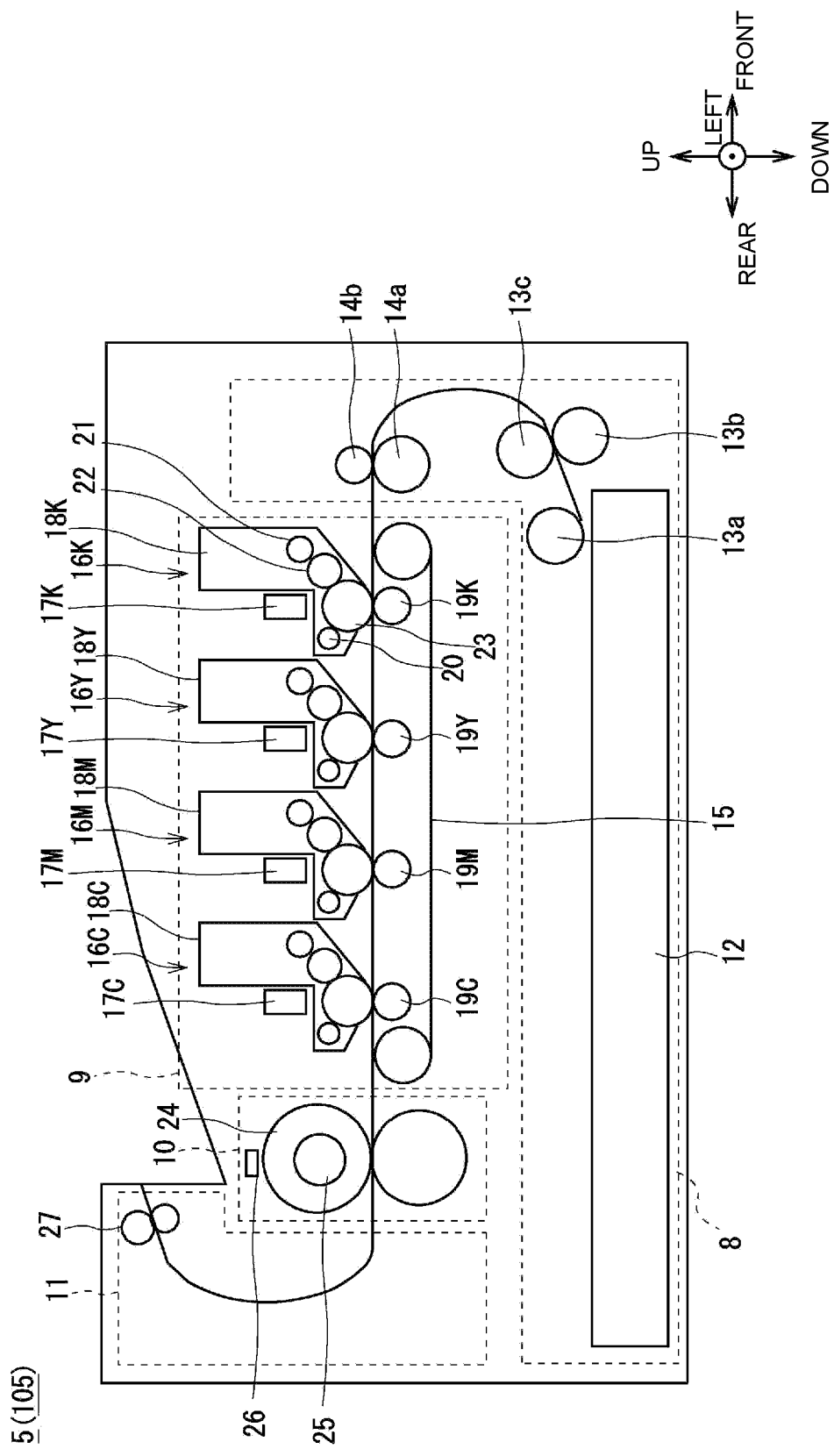
FIG. 1 is a left side view illustrating a configuration of an image formation apparatus.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

1. Overall Configuration of Image Formation Apparatus

As illustrated in FIG. 1, an image formation apparatus 5 is a color electrophotographic printer, and prints a desired color image on paper of, for example, A3 size or A4 size. Incidentally, in the following description, a right end portion of FIG. 1 corresponds to a front side of the image formation apparatus 5, and the terms upward and downward directions, leftward and rightward directions, and forward and rearward directions are used from the viewpoint of a person facing the front side.

The image formation apparatus 5 includes a paper feeder 8, an image formation section 9 (an image formation device), a fixation device 10, and a paper discharging part 11. The paper feeder 8 includes a paper cassette 12 that stores paper, a pickup roller 13a that picks up paper stored in the paper cassette 12, a separation roller 13b, a paper feeding roller 13c, and registration rollers 14a and 14b that transport fed paper to the image formation section 9.

The image formation section 9 is provided above the paper cassette 12 in the image formation apparatus 5, and includes a transfer belt 15, image formation units 16 (image formation units 16K, 16Y, 16M, and 16C), LED heads 17

(LED heads 17K, 17Y, 17M, and 17C), toner cartridges 18 (toner cartridges 18K, 18Y, 18M, and 18C), and transfer rollers 19 (transfer rollers 19K, 19Y, 19M, and 19C).

The transfer belt 15 is an endless belt that is looped around and supported by rollers whose center axes extend in the leftward/rightward direction, one being disposed on each side in the forward/rearward direction. When the transfer belt 15 is moved by rotation of the rollers, the transfer belt 15 transports paper received from the registration rollers 14a and 14b in the rearward direction with the paper placed on the upper surface of the transfer belt 15.

The four image formation units 16 (image formation units 16K, 16Y, 16M, and 16C (hereinafter collectively referred to as an image formation unit 16)) are provided above the transfer belt 15 and arranged sequentially from the front side to the rear side. In other words, the image formation units 16 having the respective colors are arranged in a so-called tandem manner. The image formation units 16K, 16Y, 16M, and 16C correspond to black (K), yellow (Y), magenta (M), and cyan (C), respectively. The image formation units 16K, 16Y, 16M, and 16C have the same configuration, except for corresponding toner colors.

Figure 2:
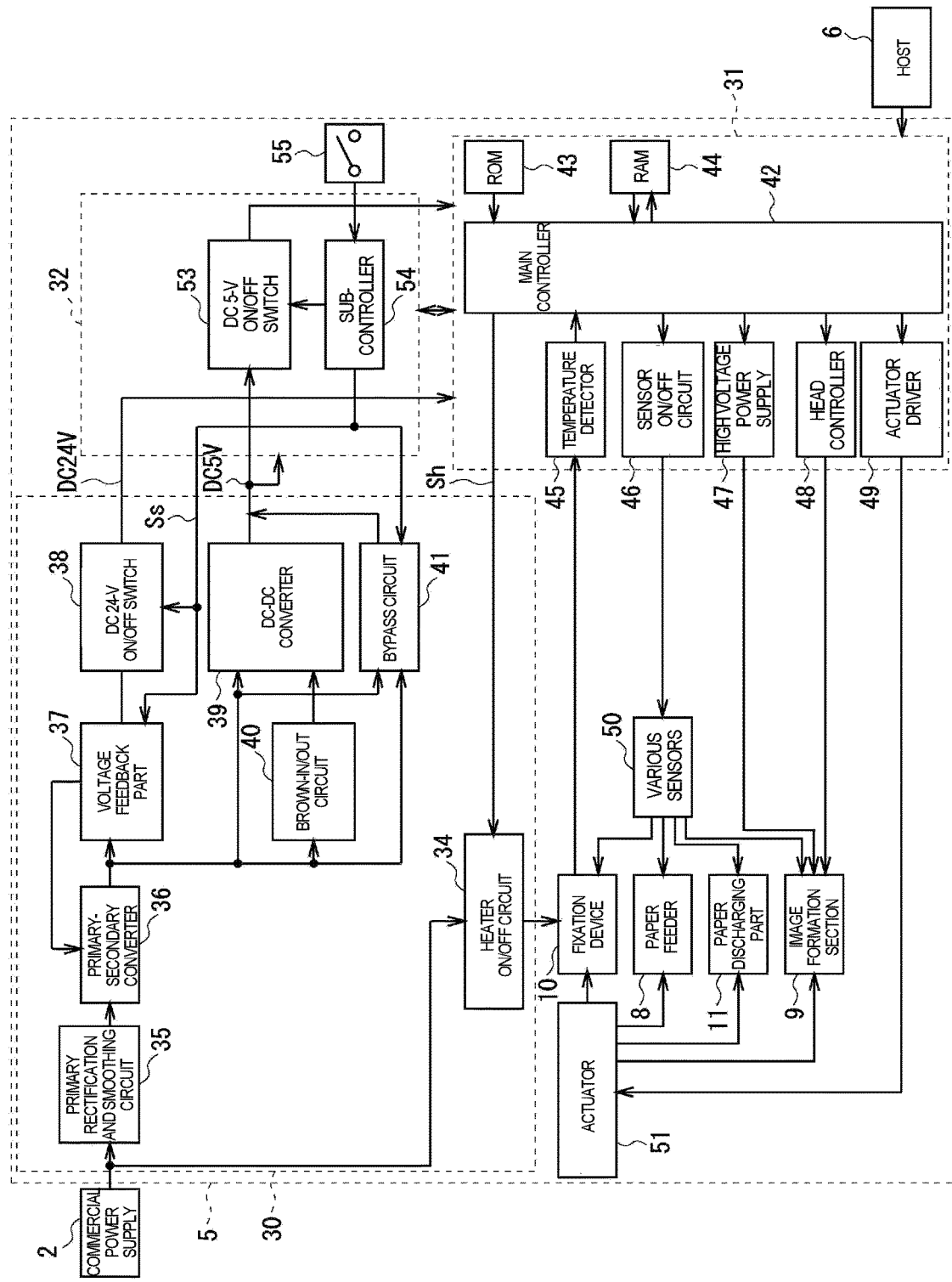
FIG. 2 is a circuit diagram illustrating a control configuration of an image formation apparatus.

The LED heads 17K, 17Y, 17M, and 17C (hereinafter collectively referred to as an LED head 17) are provided, corresponding to the image formation units 16K, 16Y, 16M, and 16C, respectively. The LED head 17 has a rectangular cuboid shape that is elongated in the leftward/rightward direction. In the LED head 17, light emitting diodes (LEDs) are arranged sequentially in the leftward/rightward direction. Each LED is caused to emit light with an emission pattern based on image data supplied from a head controller 48 (FIG. 2). The image formation unit 16 is located very close to the LED head 17, and performs an exposure process using light from the LED head 17.

The toner cartridges 18K, 18Y, 18M, and 18C (hereinafter collectively referred to as a toner cartridge 18) are arranged above and coupled to the image formation units 16K, 16Y, 16M, and 16C, respectively. The toner cartridges 18 are a long, hollow container extending in the leftward/rightward direction, contain toner powders having the respective colors, and have a predetermined built-in stirring mechanism.

The transfer rollers 19K, 19Y, 19M, and 19C (hereinafter collectively referred to as a transfer roller 19) are provided at four portions directly below the respective image formation units 16. Specifically, the transfer belt 15 is interposed between each image formation unit 16 and the corresponding transfer roller 19 with the image formation unit 16 facing the upper side portion of the transfer belt 15. Incidentally, the transfer roller 19 is configured to be able to be charged.

The image formation unit 16 includes a charging roller 20, a toner supply roller 21, a development roller 22, and a photosensitive drum 23. The charging roller 20 uniformly charges a surface of the photosensitive drum 23 to a high voltage. The toner supply roller 21 supplies toner to the development roller 22. The development roller 22 develops an electrostatic latent image formed on the surface of the photosensitive drum 23 using toner carried by the development roller 22. The photosensitive drum 23 is a member that carries an electrostatic latent image on a surface (surface layer portion) thereof, and transfers the toner image developed on the surface to paper.

The fixation device 10 is provided downstream of the image formation section 9, and includes a fixation roller 24, a heater 25, and a temperature detection sensor 26. The fixation roller 24 fixes the toner image to paper. The heater 25 is provided in the fixation roller 24, and is, for example, a halogen lamp or ceramic heater. The temperature detection sensor 26 is a thermistor that detects the temperature of a surface of the fixation roller 24. The paper discharging part 11 includes a discharging roller 27 that discharges paper on which fixation has been completed, out of the image formation apparatus 5.

2. Control Configuration of Image Formation Apparatus

As illustrated in FIG. 2, an image formation apparatus 1 mainly includes a power supply unit 30, a main control block 31, and a sub-control block 32.

2-1. Configuration of Power Supply Unit

The power supply unit 30 mainly includes a heater on/off circuit 34, a primary rectification and smoothing circuit 35, a primary-secondary converter 36, a voltage feedback part 37, a DC 24-V on/off switch 38, a DC-DC converter 39, a brown-in/out circuit 40, and a bypass circuit 41. The power supply unit 30 is operated using an AC voltage (AC power) output from a commercial power supply 2. The commercial power supply 2 provides an AC voltage of 100 [V] (AC power), which is supplied from, for example, an outlet.

The heater on/off circuit 34 is provided at an input portion of the power supply unit 30, and switches on/off the heater 25 (FIG. 1) in the fixation device 10 according to a heater on/off signal Sh output from a main controller 42. The primary rectification and smoothing circuit 35 is provided at an input portion of the power supply unit 30, and rectifies and smooths an AC voltage supplied from the commercial power supply 2.

The primary-secondary converter 36 transforms the rectified and smoothed voltage, and supplies the resultant DC voltage to the main control block 31 and the sub-control block 32. Incidentally, in the main control block 31 or the sub-control block 32, a DC voltage of 24 V or a DC voltage of 5 V may be decreased, and the decreased DC voltage may be supplied to logic systems in the main control block 31 and the sub-control block 32. The primary-secondary converter 36 has winding outputs in the secondary, and may generate other DC voltages in addition to a DC voltage of 24 V. The voltage feedback part 37 detects a voltage output from the primary-secondary converter 36, and feeds the result back to the primary-secondary converter 36.

The DC 24-V on/off switch 38 includes a relay or a field effect transistor (FET), and switches on/off a DC voltage of 24 V output from the power supply unit 30, according to a sleep signal Ss output from a sub-controller 54.

The DC-DC converter 39 is a circuit that decreases a DC voltage of 24 V output from the primary-secondary converter 36 to a DC voltage of 5 V, and supplies the DC voltage of 5 V to the sub-control block 32. The DC-DC converter 39 typically includes an integrated circuit (IC). In this embodiment, a combination of such an IC and a peripheral circuit is referred to as a DC-DC converter. In this embodiment, the power supply unit 30 supplies a DC voltage of 24 V to an actuator system in the main control block 31, and a DC voltage of 5 V to logic systems in the main control block 31 and the sub-control block 32. The type of a DC voltage output from the power supply unit 30 is typically determined by the configuration of the main control block 31 and the sub-control block 32. The power supply unit 30 typically outputs a DC voltage of 3.3 V in addition to a DC voltage of 24 V and a DC voltage of 5 V.

The brown-in/out circuit 40 detects an input voltage of the DC-DC converter 39, i.e., an output voltage of the primary-secondary converter 36, and switches on/off the DC-DC converter 39 using a function of a DC-DC converter IC with reference to a certain threshold.

The bypass circuit 41 is provided in parallel with the DC-DC converter 39. When the image formation apparatus 5 is in a sleep mode, then if the bypass circuit 41 is put into an on state, the bypass circuit 41 outputs a DC voltage of 5 V output from the primary-secondary converter 36 without through the DC-DC converter 39, i.e., with the DC-DC converter 39 bypassed. The bypass circuit 41 is in an off state when the image formation apparatus 5 is in a normal operation mode. In the normal operation mode, the DC-DC converter 39 is operated to decrease a DC voltage of 24 V output from the primary-secondary converter 36 to a DC voltage of 5 V.

2-2. Configuration of Main Control Block

The main control block 31 includes a main controller 42, a read-only memory (ROM) 43, a random access memory (RAM) 44, a temperature detector 45, a sensor on/off circuit 46, a high-voltage power supply 47, a head controller 48, and an actuator driver 49.

The main controller 42 includes a central processing unit (CPU) (not illustrated). The main controller 42 reads a program from the ROM 43, which is a non-volatile storage part storing programs and setting data, and operates according to the program to control the entire image formation apparatus 5 in a centralized manner. The main controller 42, when receiving image data indicating a color image to be printed from a host 6 that is a higher-level device coupled to the image formation apparatus 5, and a command to print the color image, executes a print process of forming a printed image on a surface of paper. The main controller 42 includes a counter for measuring time, and the like. The RAM 44 stores data, which is read by the main controller 42.

The temperature detector 45 divides an output of the temperature detection sensor 26 (FIG. 1) in the fixation device 10 using resistors, and outputs a temperature detection signal to the main controller 42. The sensor on/off circuit 46, which includes a transistor, basically receives a sensor on/off signal from the main controller 42 and switches off the supply of power to various sensors 50 described below, unless the image formation apparatus 5 is in a warm-up operation during activation or is performing printing according to a command from the host 6 or the like.

The high-voltage power supply 47 applies a high voltage to the photosensitive drum 23 and the rollers of the image formation section 9 (FIG. 1). The head controller 48 is a controller that controls on/off of the LED head 17 (FIG. 1). The actuator driver 49 is a dedicated driver that outputs a drive signal to an actuator 51 described below based on a logic signal output from the main controller 42.

Various sensors 50 are a paper travel path sensor for detecting paper location (not illustrated), a sensor for correcting image density, a sensor for correcting color deviation, and the like, which are provided in the paper feeder 8, the image formation section 9, the fixation device 10, and the paper discharging part 11. The actuator 51 includes a motor, a clutch, a solenoid, and a cooling fan (not illustrated), which are provided in the paper feeder 8, the image formation section 9, the fixation device 10, and the paper discharging part 11. The actuator 51 is driven by the actuator driver 49.

2-3. Configuration of Sub-Control Block

The sub-control block 32 includes a DC 5-V on/off switch 53 and a sub-controller 54. The DC 5-V on/off switch 53 includes a FET or transistor that is a semiconductor, or a relay. The DC 5-V on/off switch 53 switches on/off of a DC voltage of 5 V output from the power supply unit 30 under the control of the sub-controller 54. The sub-controller 54 is a microcomputer for a low consumption mode. The sub-controller 54 outputs a low consumption mode signal such as the sleep signal Ss. The sub-controller 54 can transition from a normal operation mode to a sleep mode that is a type of low consumption mode, after a preset time has passed or in association with on/off of a mechanical switch 55 that is pressed down by a user, and can return from the sleep mode to the normal operation mode in association with on/off of the mechanical switch 55 that is pressed down by a user.

3. Detailed Configuration of Power Supply Unit

Figure 3:
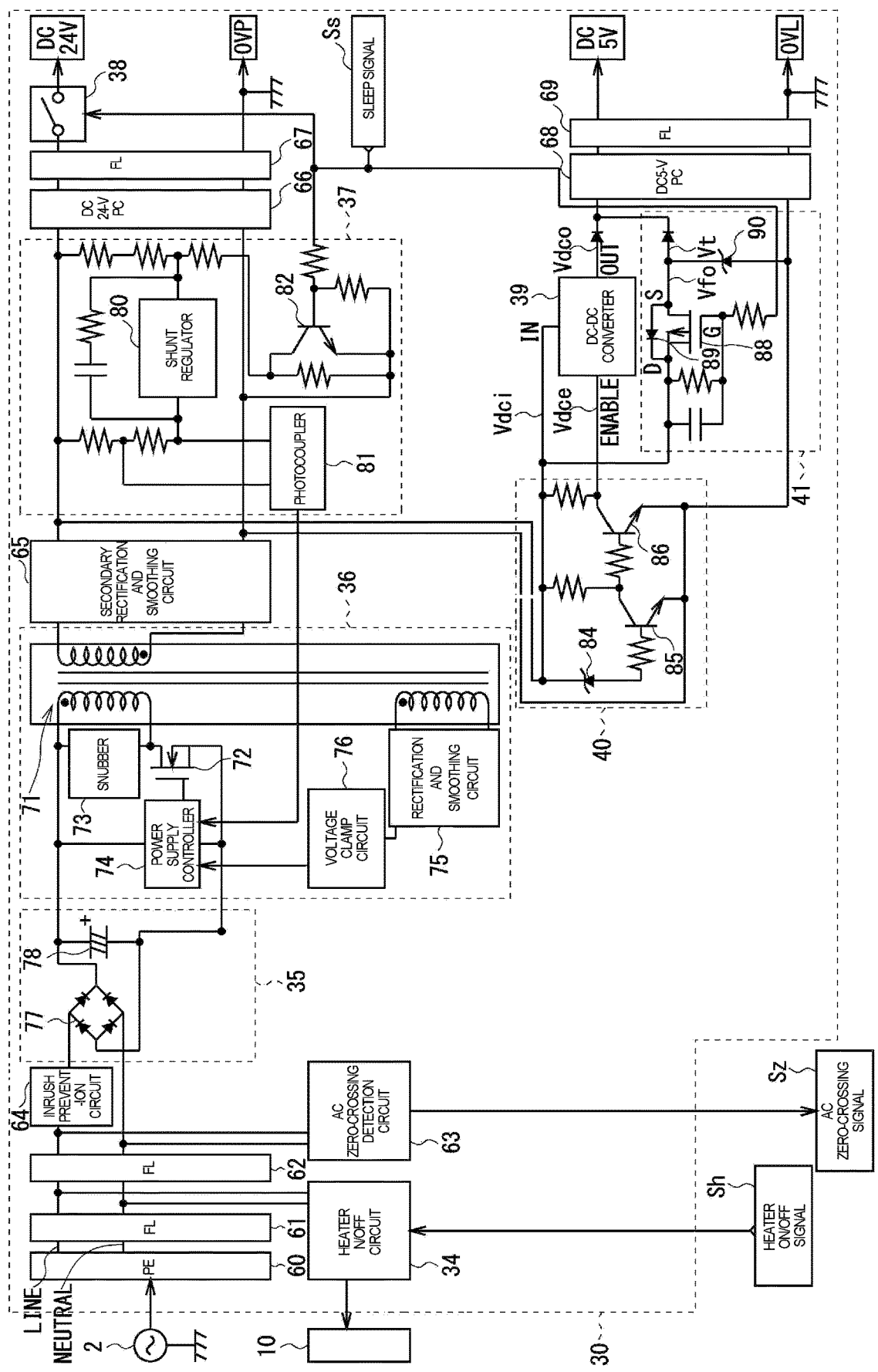
FIG. 3 is a circuit diagram illustrating a detailed configuration of a power supply unit.

As illustrated in detail in FIG. 3, the power supply unit 30 includes a protection element 60, a filter 61, a filter 62, a heater on/off circuit 34, an AC zero-crossing detection circuit 63, an inrush prevention circuit 64, a primary rectification and smoothing circuit 35, a primary-secondary converter 36, a secondary rectification and smoothing circuit 65, a voltage feedback part 37, a DC 24-V protection circuit 66, a secondary filter 67, a DC 24-V on/off switch 38, a DC-DC converter 39, a brown-in/out circuit 40, a DC 5-V protection circuit 68, a filter 69, and a bypass circuit 41.

The protection element 60 includes a fuse for protection from overcurrent, a varistor for protection from lightning surge, or the like, and is coupled to the commercial power supply 2. The filter 61 includes a common-mode or normal-mode choke coil and a capacitor, and is coupled to the protection element 60. The capacitor, which is a so-called X capacitor, is coupled between LINE and NEUTRAL. In addition, a Y capacitor is also provided between LINE or NEUTRAL and a frame ground (FG).

The heater on/off circuit 34 includes a TRIAC and a photoTRIAC (not illustrated). The heater on/off circuit 34 switches on/off the photoTRIAC according to the heater on/off signal Sh output from the main controller 42 (FIG. 2) to switch on/off the TRIAC, so that an electric current passes through the heater 25 (FIG. 1) in the fixation device 10. The heater on/off circuit 34 may include a relay in order to take measures for an anomaly such as TRIAC runaway. A plurality of heater on/off circuits 34 may be provided, depending on the number of heaters. The filter 62 is provided downstream of the heater on/off circuit 34. The filter 62 has a configuration similar to that of the filter 61.

The AC zero-crossing detection circuit 63 is provided upstream of the primary rectification and smoothing circuit 35, and includes a rectification diode and a photocoupler (not illustrated). The AC zero-crossing detection circuit 63 outputs an AC zero-crossing signal Sz that goes to a high level at a zero-crossing point, to the main controller 42 (FIG. 2). The configuration of the AC zero-crossing detection circuit 63 is not particularly limited.

The inrush prevention circuit 64, which is provided upstream of the primary rectification and smoothing circuit 35, prevents an inrush current during charging of an electrolytic capacitor 78 of the primary rectification and smoothing circuit 35. The inrush prevention circuit 64 may be configured at low cost using a thermistor, but in that case, cannot prevent an inrush current at high temperature. Therefore, the inrush prevention circuit 64 may be configured using a circuit that is a combination of a thermistor with a resistor and a switching element such as a TRIAC or a relay.

The primary rectification and smoothing circuit 35 includes a rectification diode 77 and an electrolytic capacitor 78, and is provided upstream of the primary-secondary converter 36. The rectification diode 77 includes four diodes. As the rectification diode 77, an element called a bridge diode with four elements is often used. As the electrolytic capacitor 78, an aluminum electrolytic capacitor is typically used.

The primary-secondary converter 36 incudes a transformer 71, a main FET 72, a snubber circuit 73, a power supply controller 74, an auxiliary winding rectification and smoothing circuit 75, and a voltage clamp circuit 76. The transformer 71, in which the primary is insulated from the secondary, transforms a voltage that is input from the commercial power supply 2 and then rectified and smoothed by the primary rectification and smoothing circuit 35. The main FET 72 is a so-called switching FET that switches on/off the supply of power to the primary winding of the transformer 71. The snubber circuit 73, which includes a first recovery diode, a resistor, and a capacitor, inhibits a surge voltage from occurring when the main FET 72 is switched off. As the snubber circuit 73, a Zener diode may be used in order to achieve low consumption. The power supply controller 74 determines the on-duty of the gate voltage of the main FET 72 mainly based on the result of feedback of a DC output voltage on the secondary. In this embodiment, the power supply controller 74 is a separately excited IC. Alternatively, the power supply controller 74 may be a self-excited IC that uses an auxiliary winding output voltage described below. The auxiliary winding rectification and smoothing circuit 75, which includes a rectification diode and an electrolytic capacitor, mainly rectifies and smooths an auxiliary winding output voltage that is a power supply voltage for the power supply controller 74. The voltage clamp circuit 76, which includes a Zener diode, a rectification diode, a transistor, and a resistor, clamps the auxiliary winding output voltage when the auxiliary winding output voltage exceeds the absolute maximum rating of power supply control.

The secondary rectification and smoothing circuit 65 is coupled downstream of the primary-secondary converter 36, and rectifies and smooths the secondary winding output voltage of the transformer 71. In the case in which a DC voltage of 24 V and a DC voltage of 5 V are the two winding outputs, a rectification diode and an electrolytic capacitor are provided for each of the DC voltage of 24 V and the DC voltage of 5 V (not illustrated). A DC-DC converter may be coupled to a single output for a DC voltage of 24 V, and may output a DC voltage of 5 V. The DC voltage of 5 V may be used in logic systems in the main control block 31 and the sub-control block 32. Instead of the DC voltage of 5 V, other voltages such as a DC voltage of 3.3 V may be used.

The voltage feedback part 37 is coupled downstream of the secondary rectification and smoothing circuit 65, and receives the sleep signal Ss. The voltage feedback part 37 includes a shunt regulator 80, a photocoupler 81, and a set voltage conversion transistor 82. The shunt regulator 80 is an IC that has a reference voltage, and sets a DC output voltage using a peripheral voltage-dividing resistor. The shunt regulator 80, when an actual voltage fluctuates from the set voltage, switches on/off the photocoupler 81, which is coupled to the shunt regulator 80, and feeds the result of the detection back to the power supply controller 74, thereby stabilizing the DC voltage of 24 V. The set voltage conversion transistor 82 is switched on/off according to the sleep signal Ss output from the sub-controller 54 (FIG. 2) to change a peripheral voltage-dividing resistance value of the shunt regulator 80, thereby changing the set voltage, and thereby changing the output voltage of the primary-secondary converter 36.

The DC 24-V protection circuit 66 includes an overvoltage detection circuit or an overcurrent detection circuit. The overvoltage detection circuit includes a Zener diode and a photocoupler. When the overvoltage detection circuit detects an overvoltage, the overvoltage detection circuit is latched or the switching of the overvoltage detection circuit is intermittently stopped, by the power supply controller 74 for the primary. In addition, when an overvoltage is detected, the auxiliary winding output voltage also increases, which can be detected by the power supply controller 74 for the primary. The overcurrent detection circuit may have various circuit configurations such as current detection, DC output voltage droop, and fuse. The power supply controller 74 can be used to detect an overcurrent as a primary current. The secondary filter 67, which is an LC filter, is used to inhibit a ripple voltage or a ripple noise voltage, but is not necessarily essential.

The DC 24-V on/off switch 38, which is a semiconductor, a relay, or the like, is switched on/off according to the sleep signal Ss output from the sub-controller 54 (FIG. 2). The DC 24-V on/off switch 38 switches on/off the supply of the output voltage of the primary-secondary converter 36 to the main controller 42, according to the sleep signal Ss output from the sub-controller 54.

The DC-DC converter 39 decreases a DC voltage of 24 V voltage output from the secondary rectification and smoothing circuit 65 (i.e., the primary-secondary converter 36) to a DC voltage of 5 V, and outputs the DC voltage of 5 V. The type of the DC-DC converter 39 is determined between the drop type and the switching type, depending on the load current. In addition, a switching frequency is typically determined. In this embodiment, it is assumed that the DC-DC converter 39 is of the switching type. The input terminal and output terminal of the DC-DC converter 39 are referred to as an IN terminal and an OUT terminal, respectively. Furthermore, the DC-DC converter 39 is often a DC-DC converter IC that has an on/off function at an external terminal thereof. In this embodiment, the external terminal is referred to as an ENABLE terminal.

The brown-in/out circuit 40 is coupled downstream of the secondary rectification and smoothing circuit 65, and mainly includes a brown-in/out Zener diode 84, an upstream transistor 85, and a downstream transistor 86. The collector terminal of the downstream transistor 86 is coupled to the ENABLE terminal of the DC-DC converter 39. The brown-in/out Zener diode 84 is coupled to an output of the secondary rectification and smoothing circuit 65. The brown-in/out Zener diode 84 switches on/off the upstream transistor 85 and the downstream transistor 86, depending on whether or not a voltage higher than the Zener voltage is applied to the brown-in/out Zener diode 84 from the secondary rectification and smoothing circuit 65, thereby switching a DCDC operating voltage Vdce to a high level or a low level. The Zener voltage of the brown-in/out Zener diode 84 is any voltage that is determined by the ENABLE function or peripheral constant of the DC-DC converter 39.

The DC 5-V protection circuit 68 is provided downstream of the DC-DC converter 39, and has a configuration similar to that of the DC 24-V protection circuit 66. In the case in which the DC 5-V protection circuit 68 is coupled to the power supply controller 74, a photocoupler (not illustrated) is required. The DC 24-V protection circuit 66 and the DC 5-V protection circuit 68 may share a single common output.

The filter 69, which is an LC filter, is used to inhibit a ripple voltage or a ripple noise voltage, but is not necessarily essential.

The bypass circuit 41 mainly includes a bypass circuit FET 88, a rectification diode 89, and a Zener diode 90. The drain and source terminals of the bypass circuit FET 88 are coupled to the IN and OUT terminals, respectively, of the DC-DC converter 39. The gate terminal of the bypass circuit FET 88 receives the sleep signal Ss. The rectification diode 89 is coupled between the drain and source terminals of the bypass circuit FET 88. In addition, a rectification diode that is, for example, a Schottky barrier diode is coupled between the OUT terminal of the DC-DC converter 39 and the bypass circuit FET 88. The Zener diode 90, when the bypass circuit FET 88 is switched from on to off, clamps a Zener downstream voltage Vt (described below) using a Zener voltage to hold 5 [V] even if a FET output voltage Vfo (described below) increases from 5 [V] toward 24 [V].

4. Operation of Image Formation Apparatus

Figure 4:
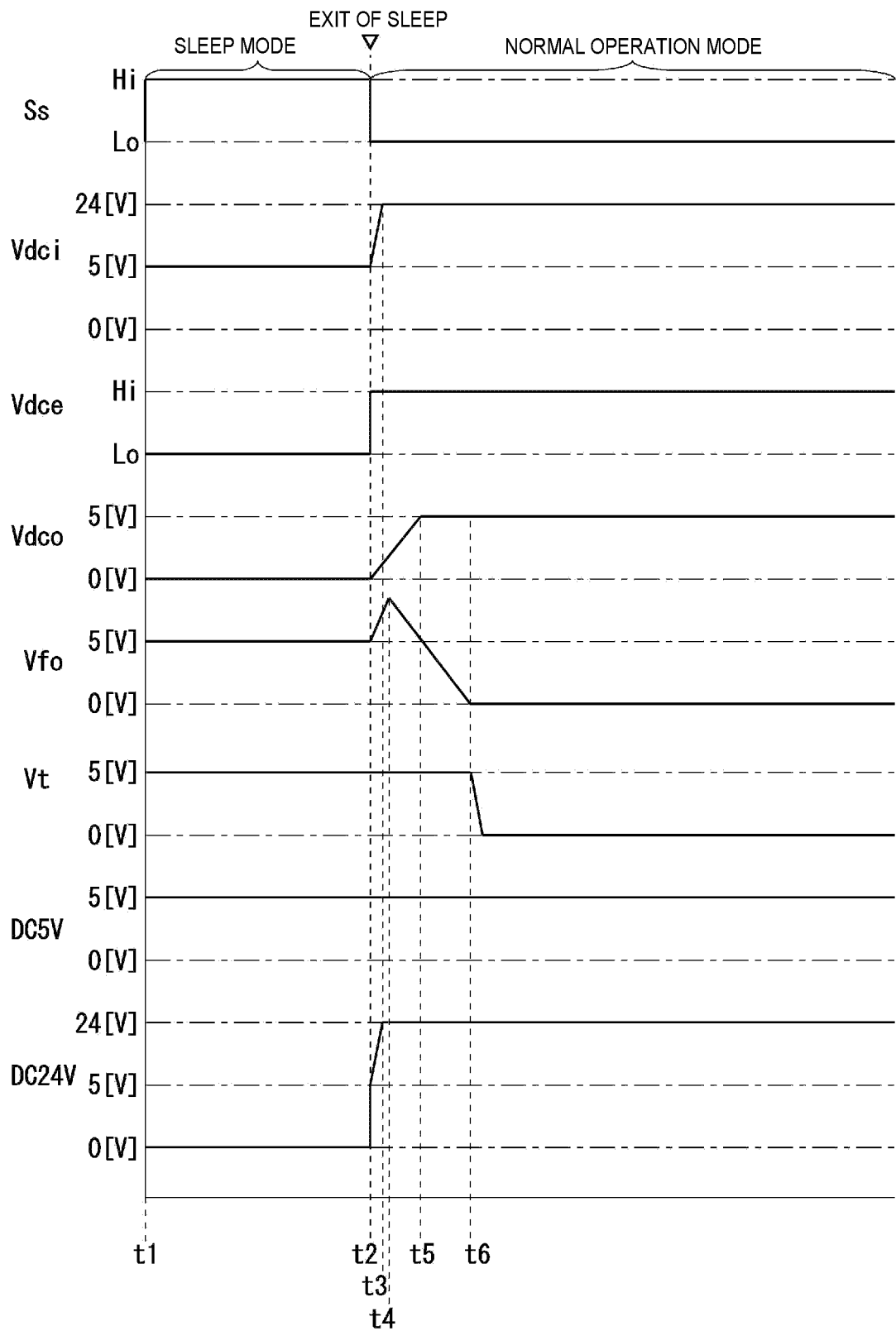
FIG. 4 is a time chart illustrating signals and voltages.

FIG. 4 illustrates a time chart of the power supply unit 30 in the sleep mode and the normal operation mode, which are a representative operation mode of the image formation apparatus 5.

4-1. Description of Entire Time Chart

In FIG. 4, the vertical axis represents voltages, and the horizontal axis represents elapsed time. FIG. 4 illustrates eight waveforms of the sleep signal Ss, a DCDC input voltage Vdci, a DCDC operating voltage Vdce, a DCDC output voltage Vdco, a FET output voltage Vfo, a Zener downstream voltage Vt, a DC 5-V output voltage, and a DC 24-V output voltage.

The horizontal axis of FIG. 4 also indicates the case in which the image formation apparatus 5 transitions to the sleep mode and then to the normal operation mode in sequence. The sleep mode is a type of low consumption mode (energy-saving mode). The normal operation mode is a mode that occurs after exit of the sleep mode, including an initial mode, a print mode, a wait mode, and a power-saving mode.

Specifically, at time t1, the image formation apparatus 5 is in the sleep mode. At time t2, the sleep mode is exited, so that the image formation apparatus 5 transitions to the initial mode, and starts a warm-up operation, and after a predetermined time has passed, transitions to the print mode.

4-2. Description of Each Signal Waveform

The sleep signal Ss is output from the sub-controller 54 and is then input to the DC 24-V on/off switch 38, the voltage feedback part 37, and the bypass circuit 41. The sleep signal Ss has positive polarity, and therefore, goes to a low level (OFF) when the operation mode is the normal operation mode. As a result, a DC voltage of 24 V is output. Meanwhile, when the operation mode is the sleep mode, the sleep signal Ss goes to a high level (ON). As a result, the output of a DC voltage of 24 V is stopped. The sleep signal Ss may have negative polarity.

The DCDC input voltage Vdci is input to the IN terminal of the DC-DC converter 39, i.e., represents the output voltage of the secondary rectification and smoothing circuit 65. The DCDC operating voltage Vdce represents a voltage that is input to the ENABLE terminal of the DC-DC converter 39. The DCDC output voltage Vdco represents the output voltage of an output portion (i.e., the OUT terminal) of the DC-DC converter 39.

The FET output voltage Vfo represents the output voltage (the voltage of the source terminal) of the bypass circuit FET 88 of the bypass circuit 41. The Zener downstream voltage Vt represents the voltage of an output portion of the Zener diode 90.

The DC 5-V output voltage represents an output voltage that is a DC voltage of 5 V output from the power supply unit 30 to the sub-control block 32. The DC 24-V output voltage represents an output voltage that is a DC voltage of 24 V output from the power supply unit 30 to the main control block 31.

4-3. Operation

The image formation apparatus 5 is in the sleep mode, and at time t1, the sleep signal Ss output from the sub-controller 54 is at the high level, and therefore, the DC 24-V on/off switch 38 is off, and the DC 24-V output voltage is 0 [V]. It should be noted that at time t1 the primary-secondary converter 36 is operating. In addition, as the sleep signal Ss is at the high level, the set voltage conversion transistor 82 is on, and the set voltage has been changed from a DC voltage of 24 V. In this embodiment, the set voltage conversion transistor 82 has changed the set voltage to, for example, a DC voltage of 5 V. As the set voltage of the voltage feedback part 37 has been changed from a DC voltage of 24 V to a DC voltage of 5 V, the DCDC input voltage Vdci is maintained at 5 [V].

In the brown-in/out circuit 40, as the Zener voltage of the brown-in/out Zener diode 84 is set higher than a DC voltage of 5 V, the upstream transistor 85 is off and the downstream transistor 86 is on, so that the DCDC operating voltage Vdce is at the low level. Therefore, at time t1, the DC-DC converter 39 is not operating, and the DCDC output voltage Vdco is 0 [V]. In addition, at time t1, the sub-controller 54 applies the sleep signal Ss with the high level to the gate terminal of the bypass circuit FET 88, so that the bypass circuit FET 88 is on, which allows conduction between the drain terminal and the source terminal. Therefore, the FET output voltage Vfo is 5 [V], which is the output voltage of the secondary rectification and smoothing circuit 65 in the sleep mode, and the Zener downstream voltage Vt is also 5 [V]. As a result, the DC 5-V output voltage is also 5 [V].

At time t2, when, for example, the user presses down the mechanical switch 55, the image formation apparatus 5 returns from the sleep mode to the normal operation mode, and the sub-controller 54 outputs the sleep signal Ss with the low level. Therefore, the set voltage conversion transistor 82 is switched off, and the set voltage is changed from a DC voltage of 5 V to a DC voltage of 24 V. As a result, the DCDC input voltage Vdci starts increasing from 5 [V] toward 24 [V]. When a voltage that is higher than the Zener voltage of the brown-in/out Zener diode 84 is applied as an inverse voltage to the brown-in/out circuit 40 by the DCDC input voltage Vdci, the upstream transistor 85 is switched on, and the downstream transistor 86 is switched off, so that the DCDC operating voltage Vdce goes to the high level. As a result, at time t2 the DC-DC converter 39 starts operating, so that the DCDC output voltage Vdco starts increasing from 0 [V] toward 5 [V].

When at time t2 the output voltage of the secondary rectification and smoothing circuit 65 in the sleep mode, i.e., 5 [V], is applied to the input side of the DC 24-V on/off switch 38, so that the DC 24-V on/off switch 38 is switched on according to the sleep signal Ss with the low level, the DC 24-V output voltage increases to 5 [V]. Thereafter, the DC 24-V output voltage starts increasing toward 24 [V], which is the output voltage of the secondary rectification and smoothing circuit 65 in the normal operation mode.

It should be noted that it takes a predetermined time for the DCDC input voltage Vdci to reach a voltage higher than the Zener voltage of the brown-in/out Zener diode 84 after starting increasing at time t2. Therefore, actually, the DCDC operating voltage Vdce reaches the high level a predetermined time after time t2 (not illustrated in FIG. 4).

In addition, at time t2, when the sub-controller 54 applies the sleep signal Ss with the low level to the gate terminal of the bypass circuit FET 88, the bypass circuit FET 88 is switched off, which establishes insulation between the drain and the source. However, the bypass circuit FET 88 is not immediately switched off, due to the peripheral RC time constant. Therefore, the FET output voltage Vfo is affected by the output voltage of the secondary rectification and smoothing circuit 65 in the normal operation mode, i.e., 24 [V], and therefore, increases from 5 [V]. It should be noted that as the Zener downstream voltage Vt is clamped by the Zener voltage of the Zener diode 90, the Zener downstream voltage Vt is maintained at 5 [V]. As a result, the DC 5-V output voltage is also maintained at 5 [V].

After the DCDC input voltage Vdci reaches 24 [V] at time t3, the DCDC input voltage Vdci is maintained at 24 [V] by the voltage feedback part 37. Therefore, the DC 24-V output voltage is also maintained at 24 [V]. At time t3, a voltage that is higher than the Zener voltage of the brown-in/out Zener diode 84 in the brown-in/out circuit 40 is applied as an inverse voltage by the DCDC input voltage Vdci, and therefore, the DCDC operating voltage Vdce is maintained at the high level. In addition, at time t3, the DCDC output voltage Vdco is still continuing to increase toward 5 [V]. The bypass circuit FET 88 is not immediately switched off, due to the peripheral RC time constant, and therefore, the FET output voltage Vfo continues to increase. It should be noted that as the Zener downstream voltage Vt is clamped by the Zener voltage of the Zener diode 90, the Zener downstream voltage Vt is maintained at 5 [V]. As a result, the DC 5-V output voltage is also maintained at 5 [V].

At time t4, the bypass circuit FET 88 is switched off, so that the FET output voltage Vfo starts decreasing. After the DCDC output voltage Vdco reaches 5 [V] at time t5, the DCDC output voltage Vdco is maintained at 5 [V] by the DC-DC converter 39. At time t5, the FET output voltage Vfo is still continuing to decrease toward 0 [V].

After the FET output voltage Vfo reaches 0 [V] at time t6, the FET output voltage Vfo is maintained at 0 [V] because the bypass circuit FET 88 is off. It should be noted that at time t6 the DCDC output voltage Vdco is maintained at 5 [V], and therefore, the DC 5-V output voltage is maintained at 5 [V]. At time t6 the Zener downstream voltage Vt starts decreasing toward 0 [V], and reaches 0 [V] after a predetermined time.

5. Comparative Example

Figure 5:
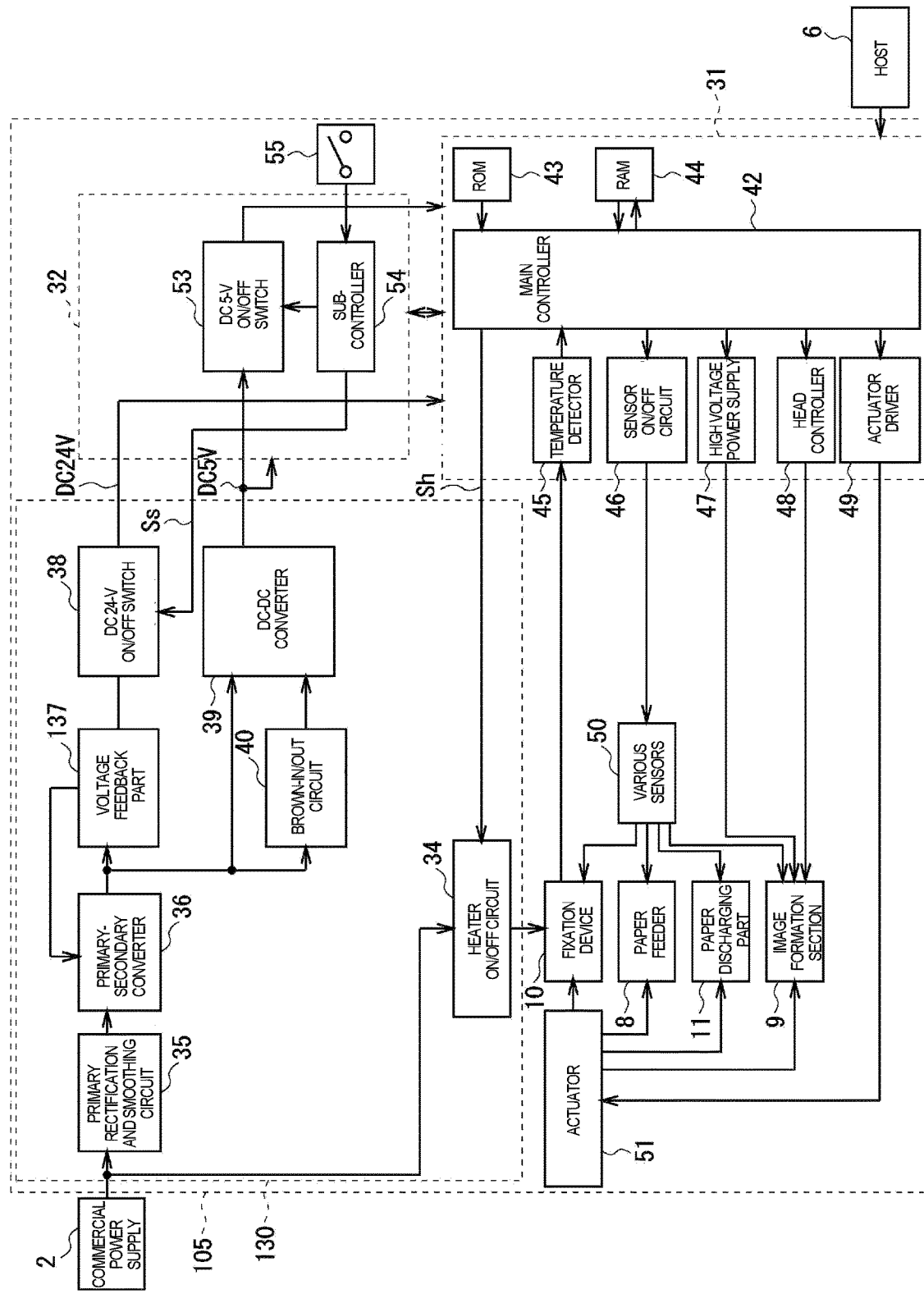
FIG. 5 is a circuit diagram illustrating a control configuration of an image formation apparatus in a comparative example.
Figure 6:
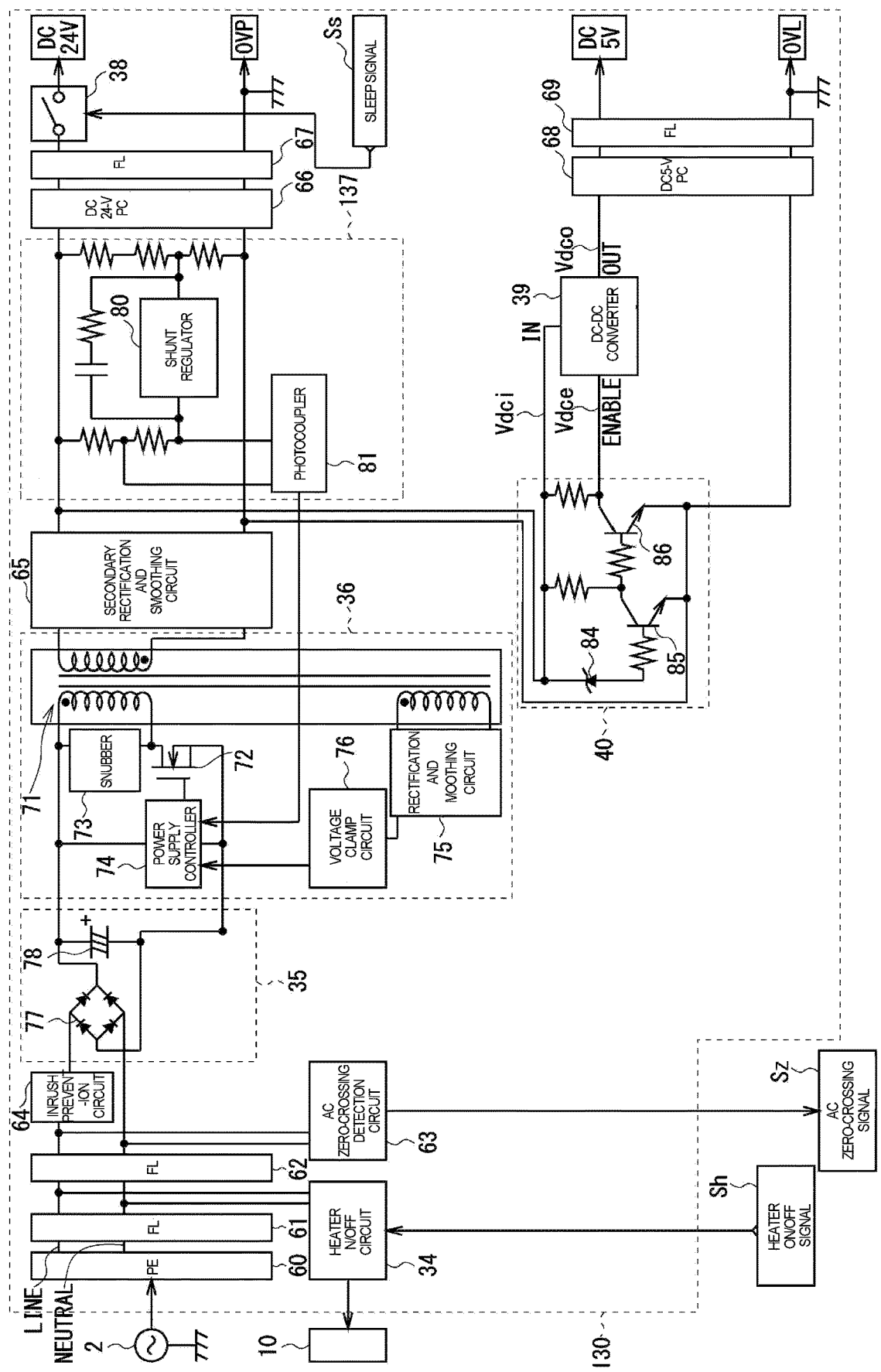
FIG. 6 is a circuit diagram illustrating a detailed configuration of a power supply unit in a comparative example.

As illustrated in FIG. 1, FIG. 5, in which members corresponding to those of FIG. 2 are indicated by the same reference characters, and FIG. 6, in which members corresponding to those of FIG. 3 are indicated by the same reference characters, an image formation apparatus 105 according to a comparative example has the same configuration as that of the image formation apparatus 5, except that a power supply unit 130 is provided instead of the power supply unit 30. The power supply unit 130 of the comparative example has the same configuration as that of the power supply unit 30, except that a voltage feedback part 137 is provided instead of the voltage feedback part 37, and the bypass circuit 41 is removed. The voltage feedback part 137 of the comparative example has the same configuration as that of the voltage feedback part 37, except that the set voltage conversion transistor 82 and several resistors are removed, and the sleep signal Ss is not input thereto.

6. Operation of Image Formation Apparatus of Comparative Example

Figure 7:
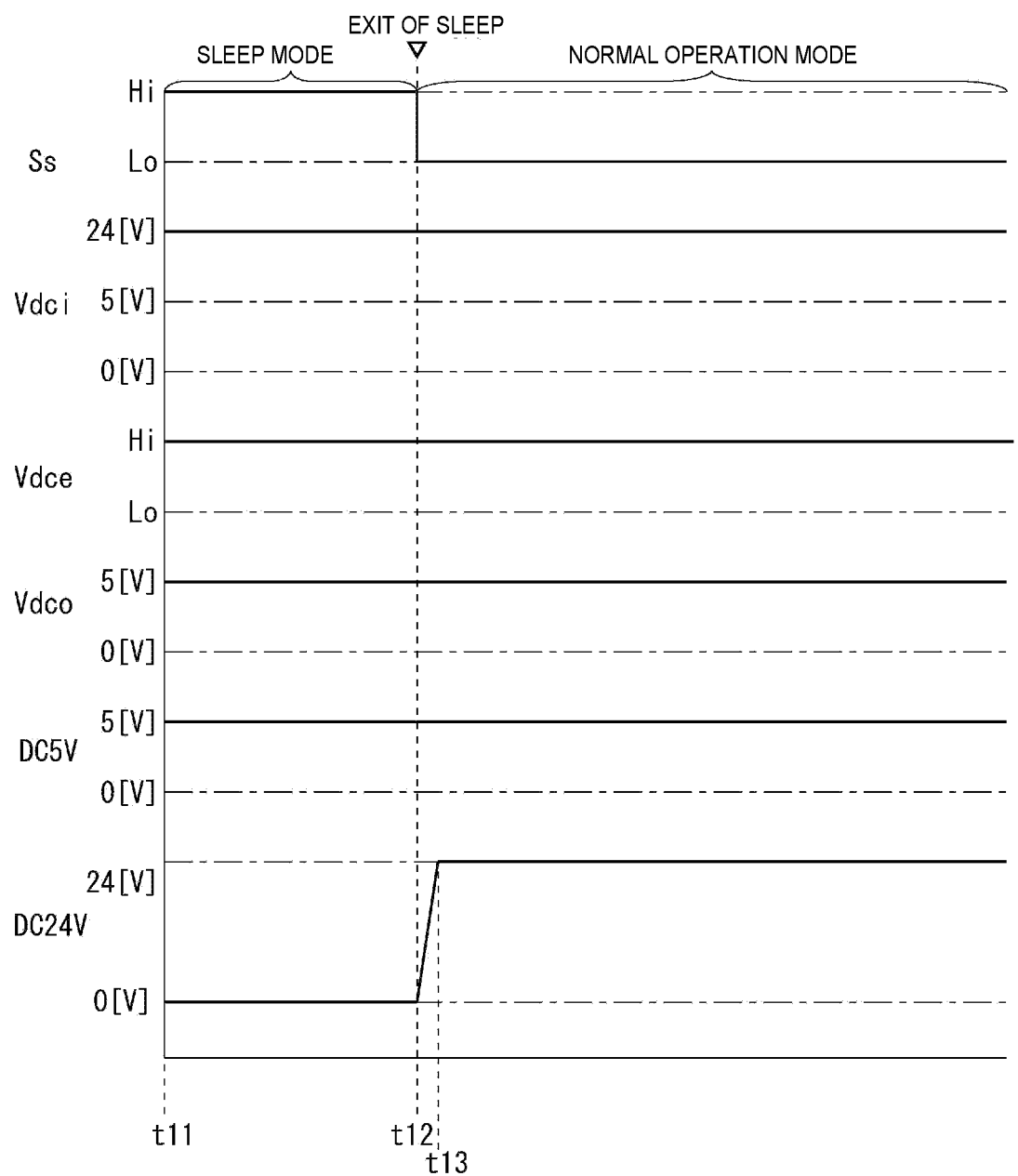
FIG. 7 is a time chart illustrating signals and voltages in a comparative example.

FIG. 7, which corresponds to FIG. 4, illustrates a time chart of the power supply unit 130 in a sleep mode and a normal operation mode, which are a representative operation mode of the image formation apparatus 105.

6-1. Description of Entire Time Chart

In FIG. 7, the vertical axis represents voltages, and the horizontal axis represents elapsed time. FIG. 7 illustrates six waveforms of the sleep signal Ss, the DCDC input voltage Vdci, the DCDC operating voltage Vdce, the DCDC output voltage Vdco, the DC 5-V output voltage, and the DC 24-V output voltage. The horizontal axis of FIG. 7 also indicates the case in which the image formation apparatus 105 transitions to the sleep mode and then to the normal operation mode in sequence.

Specifically, at time t11, the image formation apparatus 105 is in the sleep mode. At time t12, the sleep mode is exited, so that the image formation apparatus 105 transitions to the initial mode, starts a warm-up operation, and after a predetermined time has passed, transitions to the print mode.

6-2. Description of Each Signal Waveform

The sleep signal Ss, the DCDC input voltage Vdci, the DCDC operating voltage Vdce, the DCDC output voltage Vdco, the DC 5-V output voltage, and the DC 24-V output voltage are the signals and voltages at portions similar to those of the power supply unit 30.

6-3. Operation

The image formation apparatus 105 is in the sleep mode, and at time t1, the sleep signal Ss output from the sub-controller 54 is at the high level, and therefore, the DC 24-V on/off switch 38 is off, and the DC 24-V output voltage is 0 [V]. It should be noted that at time t11 the primary-secondary converter 36 is operating, and therefore, the DCDC input voltage Vdci is 24 [V]. Therefore, in the brown-in/out circuit 40, the upstream transistor 85 is on, and the downstream transistor 86 is off, so that the DCDC operating voltage Vdce is at the high level. As a result, at time t11 the DC-DC converter 39 is operating, and therefore, the DCDC output voltage Vdco is 5 [V], and the DC 5-V output voltage is 5 [V].

When at time t12, for example, the user presses down the mechanical switch 55, the image formation apparatus 105 returns from the sleep mode to the normal operation mode, and the sub-controller 54 outputs the sleep signal Ss with the low level. Therefore, the DC 24-V on/off switch 38 is switched on, and the DC 24-V output voltage starts increasing from 0 [V] toward 24 [V]. At time t12 the primary-secondary converter 36 is still operating, and therefore, the DCDC input voltage Vdci is 24 [V]. Therefore, in the brown-in/out circuit 40, the upstream transistor 85 is on, and the downstream transistor 86 is off, so that the DCDC operating voltage Vdce is at the high level. Therefore, at time t12 the DC-DC converter 39 is operating, and therefore, the DCDC output voltage Vdco is 5 [V], and the DC 5-V output voltage is 5 [V].

When the DC 24-V output voltage reaches 24 [V] at time t13, the DC 24-V output voltage is maintained at 24 [V] by the voltage feedback part 137.

7. Effects and the Like

As described above, the image formation apparatus 5 is configured to convert the commercial power supply 2 using the primary-secondary converter 36 based on feedback of a set voltage from the voltage feedback part 37 to the primary-secondary converter 36, thereby outputting a DC voltage of 24 V or a DC voltage of 5 V. The image formation apparatus 5 is also configured to switch on/off the DC-DC converter 39 that decreases a DC voltage of 24 V output from to the primary-secondary converter 36, to a DC voltage of 5 V, under the control of the brown-in/out circuit 40. Furthermore, in the image formation apparatus 5, the bypass circuit 41 that outputs a DC voltage of 5 V output from the primary-secondary converter 36 without through the DC-DC converter 39, i.e., with the DC-DC converter 39 bypassed, is provided in parallel with the DC-DC converter 39.

When the image formation apparatus 5 thus configured is in the normal operation mode, the primary-secondary converter 36 outputs and supplies a DC voltage of 24 V as a power voltage to an actuator system (power system) in the main control block 31, and the DC-DC converter 39 is switched on, so that the DC voltage of 24 V output from the primary-secondary converter 36 is decreased to a DC voltage of 5 V by the DC-DC converter 39, and is supplied as a control voltage (logic voltage) to logic systems in the main control block 31 and the sub-control block 32.

Meanwhile, when the image formation apparatus 5 is in the sleep mode, which is a power-saving mode, the primary-secondary converter 36 outputs a DC voltage of 5 V and the DC 24-V on/off switch 38 is switched off, so that a voltage is not supplied to an actuator system in the main control block 31 and the DC-DC converter 39 is switched off to be inactivated while the bypass circuit 41 is switched on, so that the DC voltage of 5 V output from the primary-secondary converter 36 is supplied as a control voltage to logic systems in the main control block 31 and the sub-control block 32, with the DC-DC converter 39 bypassed using the bypass circuit 41.

Therefore, compared to the case in which the primary-secondary converter 36 outputs a DC voltage of 24 V in the sleep mode as in the comparative example, in the image formation apparatus 5 the output voltage of the transformer 71 can be decreased, so that power consumed in the primary-secondary converter 36 can be reduced, leading to a reduction in overall power consumption in the image formation apparatus 5.

In addition, compared to the case in which in the sleep mode the DC-DC converter 39 is switched on, so that a DC voltage of 24 V output from the primary-secondary converter 36 is decreased to a DC voltage of 5 V by the DC-DC converter 39 as in the comparative example, in the image formation apparatus 5 the DC-DC converter 39 is switched off to be inactivated, and therefore, power consumed in the DC-DC converter 39 can be reduced to substantially zero, leading to a reduction in overall power consumption in the image formation apparatus 5.

The image formation apparatus 5 thus configured includes: the primary-secondary converter 36 that generates, from the commercial power supply 2, a DC voltage of 24 V as a first voltage, and a DC voltage of 5 V as a second voltage that is lower than the DC voltage of 24 V; the DC-DC converter 39 that decreases the DC voltage of 24 V to a DC voltage of 5 V; the bypass circuit 41 that outputs the DC voltage of 5 V output from the primary-secondary converter 36, with the DC-DC converter 39 bypassed; and the sub-controller 54 that, in the normal operation mode, causes the primary-secondary converter 36 to generate and output a DC voltage of 24 V, and causes the DC-DC converter 39 to operate and decrease the DC voltage of 24 V to a DC voltage of 5 V and output the DC voltage of 5 V, and in the sleep mode, which is a power-saving mode, causes the primary-secondary converter 36 to generate a DC voltage of 5 V instead of a DC voltage of 24 V, and output the DC voltage of 5 V through the bypass circuit 41 without causing the DC-DC converter 39 to operate.

As a result, in the image formation apparatus 5, in the sleep mode power consumed in the primary-secondary converter 36 and the DC-DC converter 39 can be reduced, leading to a reduction in overall power consumption in the image formation apparatus 5 in the sleep mode, even in the case in which the image formation apparatus 5 is a single transformer.

8. Other Embodiments

It should be noted that in the above-described embodiment the case has been described in which, in the image formation apparatus 5, the bypass circuit 41 mainly includes the bypass circuit FET 88, which serves as a switch. The invention is not limited to this. In the image formation apparatus 5, the bypass circuit 41 may include, for example, a transistor that is a semiconductor instead of a FET, or various relays. Thus, in the image formation apparatus 5, in the sleep mode the bypass circuit that includes various types of switches is switched on, and a DC voltage of 5 V output from the secondary rectification and smoothing circuit 65 (i.e., the primary-secondary converter 36) is output without through the DC-DC converter 39, i.e., with the DC-DC converter 39 bypassed, and in the normal operation mode, the bypass circuit that includes various types of switches is switched off, and a DC voltage of 24 V output from the secondary rectification and smoothing circuit 65 (i.e., the primary-secondary converter 36) is decreased to a DC voltage of 5 V by the DC-DC converter 39, and the DC voltage of 5 V is output.

In addition, in the above-described embodiment, in the image formation apparatus 5 the brown-in/out Zener diode 84 is coupled to the output of the secondary rectification and smoothing circuit 65. When a DC voltage of 24 V, which is higher than the Zener voltage of the brown-in/out Zener diode 84, is applied from the secondary rectification and smoothing circuit 65, as an inverse voltage of the brown-in/out Zener diode 84, in the normal operation mode, the DCDC operating voltage Vdce is caused to go to the high level. Meanwhile, when a DC voltage of 5 V, which is lower than the Zener voltage of the brown-in/out Zener diode 84, is applied from the secondary rectification and smoothing circuit 65, as an inverse voltage of the brown-in/out Zener diode 84, in the sleep mode, the DCDC operating voltage Vdce is caused to go to the low level. Thus, in the image formation apparatus 5, the DCDC operating voltage Vdce is switched between the high and low levels, depending on the voltage detection of the DCDC input voltage Vdci by the brown-in/out circuit 40.

The invention is not limited to this. In the image formation apparatus 5, the sleep signal Ss may be input to the ENABLE terminal of the DC-DC converter 39 with the polarity of the sleep signal Ss inversed by a transistor and a resistor. When the sleep signal Ss is at the low level, the DCDC operating voltage Vdce may be caused to be at the high level, and when the sleep signal Ss is at the high level, the DCDC operating voltage Vdce may be caused to be at the low level. In other words, in the image formation apparatus 5, the DCDC operating voltage Vdce may be switched between the high and low levels, depending on detection of whether the sleep signal Ss is at the low level or the high level.

Furthermore, in the above-described embodiment, in the image formation apparatus 5 the sleep signal Ss is input to the gate terminal of the bypass circuit FET 88, and the gate voltage of the bypass circuit FET 88 is switched on by the high level of the sleep signal Ss, while the gate voltage of the bypass circuit FET 88 is switched off by the low level of the sleep signal Ss. Thus, in the image formation apparatus 5, the gate voltage of the bypass circuit FET 88 is switched on or off by the high or low level of the sleep signal Ss.

The invention is not limited to this. In the image formation apparatus 5, the output of the downstream transistor 86 of the brown-in/out circuit 40 may be coupled to the bypass circuit FET 88 so that the gate voltage of the bypass circuit FET 88 is switched on or off. In that case, in the image formation apparatus 5, the polarity may be inversed by a transistor and a resistor as appropriate.

Furthermore, in the above-described embodiment, the invention is applied to the image formation apparatus 5 including four image formation units 16. The invention is not limited to this. The invention may be applied to the image formation apparatus 5 including at most three or at least five image formation units 16 as appropriate.

Furthermore, in the above-described embodiment, the invention is applied to the image formation apparatus 5 that is a color printer having a single function. The invention is not limited to this. For example, the invention may be applied to an image formation apparatus having multiple functions such as a multi-function peripheral having a photocopier function and a facsimile device function.

Furthermore, in the above-described embodiment, the invention is applied to the image formation apparatus 5. The invention is not limited to this. The invention may be applied to various devices that are operated by AC power supplied from the commercial power supply 2.

Furthermore, the invention is not limited to the above-described embodiment or other embodiments described above. Specifically, the scope of the invention encompasses any combination of all or a part of the embodiments. The scope of the invention also encompasses any one of the embodiments a part of which is extracted and replaced or substituted with a part of another one of the embodiments, and any one of the embodiments to which the extracted part is added.

Furthermore, in the above-described embodiment, the primary-secondary converter 36 serving as a voltage generator, the DC-DC converter 39 serving as a voltage step-down part, the bypass circuit 41 serving as a bypass part, and the sub-controller 54 serving as a controller constitute the power supply unit 30 and the sub-control block 32 serving as a power supply device. The invention is not limited to this. A voltage generator, a voltage step-down part, a bypass part, and a controller that have various other configurations may constitute a power supply device.

The invention may be, for example, applicable to an image formation apparatus that is supplied with power from a commercial power supply.

The invention claimed is:
1. A power supply device comprising:
    a voltage generator configured to generate, from a commercial power supply, a first voltage and a second voltage lower than the first voltage;
    a voltage step-down part configured to decrease the first voltage to the second voltage;
    a bypass part configured to output the second voltage output from the voltage generator, with the voltage step-down part bypassed; and
    a controller configured, in a normal operation mode, to cause the voltage generator to generate and output the first voltage and to cause the voltage step-down part to operate and decrease the first voltage to the second voltage and output the second voltage, and configured, in a power-saving mode, to cause the voltage generator to generate the second voltage and output the second voltage through the bypass part without causing the voltage step-down part to operate.
2. The power supply device according to claim 1, wherein the bypass part includes a switch configured to be switched on to operate the bypass part to output the second voltage with the voltage step-down part bypassed, and configured to be switched off not to operate the bypass part and to cause the second voltage not to bypass the voltage step-down part.
3. The power supply device according to claim 2, wherein the switch comprises a semiconductor.
4. The power supply device according to claim 3, wherein the switch comprises a FET.
5. The power supply device according to claim 3, wherein the switch comprises a transistor.
6. The power supply device according to claim 2, wherein the switch comprises a relay.
7. The power supply device according to claim 2, wherein the controller is configured to switch on/off the switch by inputting, to the switch, a sleep signal that changes when the controller is switched between the normal operation mode and the power-saving mode.
8. The power supply device according to claim 2, wherein the switch is switched on and off, depending on whether or not a voltage higher than the second voltage is output from the voltage generator.
9. The power supply device according to claim 1, wherein the voltage step-down part is caused to operate or not to operate, depending on whether or not a voltage higher than the second voltage is output from the voltage generator.
10. The power supply device according to claim 1, wherein
    the controller configured to cause the voltage step-down part to operate or not to operate, depending on a sleep signal input to the voltage step-down part, the sleeping signal being changed when the controller is switched between the normal operation mode and the power-saving mode.
11. The power supply device according to claim 1, wherein the power supply device excludes other voltage generators that generate the second voltage from the commercial power supply without through the voltage generator.

12. An image formation apparatus comprising:
the power supply device according to claim 1.

* * * * *